Patented June 19, 1951

2,557,891

UNITED STATES PATENT OFFICE 2,557,891

PROCESS FOR CONTROL OF PHOSPHATE IN ALUMINA PRODUCTION

John L. Porter, Baton Rouge, La., assignor to Kaiser Aluminum & Chemical Corporation, a corporation of Delaware No Drawing. Application March 30, 1949,
Serial No. 84,489

16 Claims. (Cl. 23—143)

This invention relates to an improved process for the production of alumina from phosphorus-bearing aluminiferous ore material. More particularly, the invention relates to an improved process for recovery of high-grade alumina from bauxite ores having a relatively high phosphorus content by suppressing dissolution of the phosphate and/or precipitation and removal of dissolved phosphate.

The invention is primarily intended for use with wet alkali aluminate methods for the production of alumina from bauxite, such as the well-known "Bayer" process in which the bauxite is digested in a caustic liquor containing sodium aluminate and sodium hydroxide to form a more concentrated sodium aluminate solution, and after removal of insoluble impurities, the alumina is recovered by hydrolysis of the aluminate solution and consequent autoprecipitation of the alumina in hydrate form.

In the past half century, the "Bayer" process and a few modifications thereof have been improved to obtain the most efficient production of alumina of optimum purity. The quantitative proportions of the several constituents of the digest liquor and the bauxite, solution concentrations at the various stages such as digestion, filtration, alumina precipitation and plant liquor recirculation, as well as conditions of temperature, pressure and duration of treatment, are quite well established.

When a bauxite containing appreciable phosphorus is used in the Bayer process, most of the phosphorus in phosphate form is dissolved out of the ore with the alumina during digestion, and is retained in the spent liquor recycled to the digester for treating fresh phosphorus-containing bauxite. The concentration of dissolved phosphate hereinafter expressed as $P_2O_5$, phosphorus pentoxide, increases to an undesirable equilibrium value under the operating conditions of temperature, caustic concentration, recycling, and the like. This $P_2O_5$ is probably present as a sodium phosphate soluble in the caustic liquor. The presence of such an undesirable $P_2O_5$ concentration in the process liquor results in production of alumina contaminated with $P_2O_5$. The degree of contamination is known to be dependent upon the "build up" or concentration of $P_2O_5$ in the liquor. Even small amounts of $P_2O_5$ in the purified alumina produce a very deleterious effect when the alumina is used as reduction cell feed for recovery of aluminum. Current efficiency and production of aluminum in the reduction cell are adversely affected. It is extremely important therefore to maintain the $P_2O_5$ concentration in the Bayer process liquor at a very low value in order to prevent excessive contamination of the alumina.

The $P_2O_5$ content of bauxites is extremely variable depending upon the particular source. For instance, Surinam bauxite usually contains only about 0.06% $P_2O_5$ by weight, while Jamaica bauxites usually contain from three to fifteen times as much, and in some instances may contain in excess of fifteen times the normal amount of $P_2O_5$ in Surinam bauxite. Thus, Jamaica bauxites normally contain from 0.2% to 1.0% $P_2O_5$. The equilibrium value of the $P_2O_5$ concentration in the Bayer process liquor increases with increasing $P_2O_5$ content of the bauxite employed. As a consequence, alumina produced from high $P_2O_5$ bauxites is excessively contaminated and undesirable as reduction cell feed.

It is known that control of the $P_2O_5$ concentration in the liquor is effected to a certain degree by the addition of lime, that is, calcium oxide or hydroxide, to the digester when practicing the method of inside causticizing. Of the total $P_2O_5$ content of a given bauxite, about 70–90% is extracted upon alkaline digestion of the ore under normal operating conditions. This may be termed the available $P_2O_5$ and is that which dissolves in the plant liquor. Thus, for a Surinam bauxite of 0.06% total $P_2O_5$, about 0.05% is extracted in the digestion of the bauxite. The unavailable fraction is thrown down with the insoluble residue or red mud in the digesters. The lime added to the digester for increasing the caustic soda concentration to the desired value (inside causticizing) by reaction of the lime and soda ash, and for setting up the proper $NaOH:Na_2CO_3$ ratio in the liquor, effectively reduces the $P_2O_5$ concentration in the liquor, presumably by formation of a precipitate of a basic calcium phosphate. The basic phosphate is insoluble in the caustic liquor, and precipitates and is removed with the red mud.

When using a Surinam bauxite of only 0.05% available $P_2O_5$, and practicing inside causticizing, the recycle liquor has a $P_2O_5$ equilibrium concentration of only about 0.2 to 0.3 grams per liter with a consequent $P_2O_5$ content in the recovered alumina of about 0.001+%. This is but a slight contamination and the alumina is suitable for reduction cell feed. However, when employing a high $P_2O_5$ bauxite, such as Jamaica bauxite, containing three to fifteen times or more available $P_2O_5$ than Surinam bauxite, the lime charged to the digester for causticizing must be increased to an excessive amount to suppress the phosphate dissolution to the required degree.

Attempts to reduce this unduly contaminating concentration of $P_2O_5$ thus require the addition of quantities of lime far in excess of the stoichiometric amount necessary for formation of calcium phosphate with the dissolved $P_2O_5$. Such an unduly large amount of lime adversely affects the solubility of the alumina and causes excessive loss thereof, apparently due to the formation of insoluble calcium aluminate, as well as increasing costs of production.

In practicing outside causticizing, that is, reaction of lime and soda ash to form the desired caustic soda solution outside of the digester, or in the absence of the bauxite, the above described inefficient control of $P_2O_5$ afforded by inside causticizing is no longer available. With no lime to the digesters, the $P_2O_5$ content of the liquor reaches a value far above the maximum permissible and causes excessive contamination of the alumina. With a high $P_2O_5$ bauxite these equilibrium values are much higher and are attained more rapidly than with relatively low $P_2O_5$ bauxite.

Lime could be added to the digester for effecting $P_2O_5$ control even though outside causticizing is practiced. However, the same disadvantages of excessive amounts of lime and consequent undue loss of alumina as are attendant with lime to the digester in inside causticizing are encountered.

It is, therefore, a primary object and purpose of the present invention to provide an improved process for recovery of high grade alumina having a minimum $P_2O_5$ content from phosphorus-bearing aluminiferous ores.

A further object is the provision of a process for the recovery of alumina from phosphorus-containing aluminiferous ores by a wet alkali aluminate method in which dissolution of the $P_2O_5$ content of the ore during digestion is suppressed and/or the $P_2O_5$ content in the process liquor is precipitated therefrom whereby the $P_2O_5$ concentration in the process liquor is maintained at a suitable low level and excessive $P_2O_5$ contamination of alumina is avoided.

A more specific object resides in the provision of a process for production of alumina of reduction grade from high $P_2O_5$ bauxites in which the $P_2O_5$ content of the recovered alumina is no higher than that of alumina produced from bauxites having from about one-third to about one-twentieth as much $P_2O_5$.

A further specific object is to provide a process for controlling the $P_2O_5$ concentration in alkaline digestion liquors wherein high $P_2O_5$ bauxites are treated for recovery of alumina whereby the contamination of alumina with $P_2O_5$ is maintained at predetermined suitable low values.

Another object of the invention is to provide a novel process for the treatment of phosphorus-bearing bauxite ores whereby the $P_2O_5$ content of alumina subsequently recovered from the treated bauxite is maintained at a suitable low value.

A further object is to provide a predigestion treatment, particularly applicable to high $P_2O_5$ bauxite ores for use in conjunction with a wet aluminate method of alumina recovery in which the predigestion treatment effectively suppresses the $P_2O_5$ dissolution on subsequent digestion and/or effects a precipitation of the $P_2O_5$ content during digestion whereby the $P_2O_5$ concentration in the digestion liquor is maintained at a suitable low level.

It has been discovered according to the invention that maintenance of the $P_2O_5$ concentration in the caustic liquor at a desired low level thereby eliminating undue contamination of recovered alumina may be accomplished by a predigestion treatment of the aluminiferous ore material with an aqueous slurry of calcium hydroxide. The thus treated ore material is thereafter subjected to the usual processing, that is, digestion in caustic liquor, the red mud or insolubles are removed, and the alumina is then recovered by precipitation from the liquor. Recycling of the caustic liquor to the digestion phase after recovery of a substantial portion of the alumina is contemplated as in the usual cyclic process, and accordingly the $P_2O_5$ content of the liquor must be taken into account.

The amount of calcium hydroxide required in the predigestion treatment is widely variable since it is dependent upon such factors as the available $P_2O_5$ content of the particular ore, and the selected value at which the $P_2O_5$ concentration in the liquor is to be maintained. The quantity of calcium hydroxide required for any given ore and for a selected maximum $P_2O_5$ concentration in the liquor is perhaps most suitably expressed as the weight of calcium hydroxide (expressed as $CaO$) added to the bauxite per unit weight of $P_2O_5$ precipitated and/or suppressed. The $P_2O_5$ precipitated or repressed is equal to the available $P_2O_5$ in the bauxite charged plus the $P_2O_5$ in the recycled spent liquor minus the $P_2O_5$ in the pregnant liquor. In other words, the ratio $CaO/P_2O_5$ is the lime added per unit weight of the total available $P_2O_5$ insolubilized or removed from the system either by suppressing dissolution or by precipitating from the liquor. As indicated above, the available $P_2O_5$ is usually 70–90% of the total $P_2O_5$ content of the ore. In determining the ratio $CaO/P_2O_5$, this value is added to the known $P_2O_5$ content of the recycled spent liquor and from this sum the amount of $P_2O_5$ in the pregnant liquor before alumina precipitation is subtracted. The amount of $P_2O_5$ in the pregnant liquor may be any desired selected value which is sufficiently low to prevent undue contamination of the alumina. On the other hand, it is not intended to effect a complete removal of all $P_2O_5$, since efficiency of lime pretreatment decreases in attempting to reduce the $P_2O_5$ concentration to an unnecessarily low value, for example, below 0.1 gram per liter.

As a specific illustration, it has been determined that in order to maintain the $P_2O_5$ concentration in the pregnant liquor at a value not in excess of 0.3 gram per liter, the weight ratio of $CaO$ to $P_2O_5$ should be about 2 to 1, for example, at least about 1.8 or 1.9 to 1. Such ratio, is, of course, substantially constant for any given ore regardless of the $P_2O_5$ content, since it is calculated on the basis of available $P_2O_5$. The actual weight of lime added in the predigestion treatment, however, will vary directly with the $P_2O_5$ content of the ore.

In the above illustration, the $P_2O_5$ concentration in the caustic liquor of about 0.3 gram per liter corresponds to accepted plant practice in the production of alumina from a low phosphorus ore, such as Surinam bauxite. As indicated above, the alumina hydrate recovered from such a liquor analyzes only about 0.001% $P_2O_5$.

The predigestion treatment is particularly advantageous when operating with high phosphorus aluminous ores since it permits recovery of alumina therefrom of the same grade or purity as that recovered from low phosphorus ores even where the differential is ten to about twenty fold. In general, the process of the invention may be practiced to maintain the $P_2O_5$ concentration in the liquor at less than one gram per liter which will effectively avoid a $P_2O_5$ content in the recovered alumina of substantially more than 0.002%. The ratio of $CaO/P_2O_5$ for lime used in controlling phosphate at a level of about one gram per liter may then be adjusted to a value only slightly in excess of 1.5, the stoichiometric ratio of CaO to $P_2O_5$ based on basic calcium phosphate as the precipitate. On the other hand, if a $P_2O_5$ contamination of alumina of 0.001% or less is desired, the $CaO/P_2O_5$ ratio may be increased to a value as high as about 3, which reduces the $P_2O_5$ concentration in the liquor to about 0.1 gram per liter or less, even for ores having a maximum $P_2O_5$ content. Higher ratios may be employed although they are not recommended in the interest of economy. Furthermore, unduly large amounts of lime in the form of calcium hydroxide, over and above that required for satisfactory repression of $P_2O_5$ dissolution and/or subsequent precipitation thereof in the digestion step, increase the loss of alumina from the system.

The calcium hydroxide employed may be derived from any type of suitably reactive lime. For example, quick lime, hydrated lime, hydrated dolomitic lime, or previously slaked lime have proved eminently satisfactory. The lime in water suspension may be added to the bauxite, or the dry lime may be charged into an aqueous slurry of bauxite, or the two components in the dry state may be introduced together into a suitable amount of water. Optimum results appear to be obtained using hydrated or previously slaked lime or other lime-containing material wherein calcium hydroxide $(Ca(OH)_2)$ is already formed before admixture with the water and bauxite ore.

The predigestion treatment conditions may be widely varied. Lime pretreatment at room temperatures is not only effective in suppressing dissolution of $P_2O_5$ in the bauxite in the digester, but also in precipitating that which is dissolved thereby maintaining the $P_2O_5$ concentration at the selected low level. Higher temperatures approximating those used in the digestion may be employed but serve no useful purpose since the lime-bauxite suspension is ultimately raised to such temperatures (e. g. 150° C.) in the digester. Moreover, the solubility of the calcium hydroxide formed is advantageously greater at room temperatures.

The quantity of water for the aqueous suspension of bauxite and lime is not critical and pretreatment is equally effective with a high solids content as at high dilution. Amounts of water of from about 40 to 50% on the weight of bauxite are advantageous. Excessive amounts of water are unnecessary and would unduly dilute the caustic liquor in the digester, or would require preliminary evaporation.

The wet lime-treated bauxite may be dried and calcined at temperatures from about 250 to 500° C. High temperature calcination exceeding 500° C. renders the alumina less soluble, so that the desired temperature is about 450 to 500° C. The resulting calcine is then subjected to the usual caustic digestion. This calcination of the pretreated bauxite slightly increases the amount of $P_2O_5$ dissolved, but advantageously increases the available alumina about one percentage point. However, in spite of the increase in $P_2O_5$ dissolution, its concentration in the digest liquor is well within the general maximum of less than 1 gram per liter using the preferred $CaO/P_2O_5$ ratios, for example, at least 1.5. In fact, in using Jamaica bauxite of 0.6% $P_2O_5$ (0.5% available) content, ten times the $P_2O_5$ content of typical Surinam bauxite, the foregoing lime pretreat-calcination procedure gave a $P_2O_5$ concentration of only 0.26 gram per liter using a $CaO/P_2O_5$ ratio of slightly less than 2 to 1.

The lime pretreatment of bauxite is particularly advantageous when practicing the Bayer process with outside causticizing, that is, no lime charged to the digester. It affords optimum control of $P_2O_5$ while advantage may be taken of the improved results obtainable where the caustic is formed outside of the digester by a separate lime-soda ash reaction. Moreover, the process may be employed in actual production in conjunction with the Bayer process without any adverse or uneconomical change in the conditions of the latter, for example, alumina to caustic ratios, caustic soda and total alkali concentrations and the ratio thereof, temperatures, methods of alumina precipitation, and recycle procedure.

It must be emphasized here that charging lime to the digester whether to effect causticizing, or only to control $P_2O_5$ or both, will not produce the results of the lime pretreatment of bauxite herein disclosed. The attempt to control $P_2O_5$ by addition of lime to the digesters requires a large excess of lime over that theoretically necessary to form normal calcium phosphate or basic calcium phosphate with the available $P_2O_5$. Assuming only the latter phosphate is formed in the caustic liquor an excess of lime of over 2.5 (250%) the stoichiometrical amount is necessary, whereas by the present pretreatment the lime required is only slightly in excess of the theoretical amount, for example, from about 50 to less than 100%. This factor in itself constitutes an appreciable saving in lime and substantially reduces costs, particularly where high $P_2O_5$ bauxites are treated.

In addition, the lime pretreatment of bauxite substantially lowers the alumina $(Al_2O_3)$ loss as compared to lime addition to the digesters. This excessive alumina loss appears to be occasioned by formation of calcium aluminate which is insoluble in the caustic liquor. Tests indicate that of the total lime reacted when charged to the digester, more than half causes precipitation of alumina and the balance precipitates $P_2O_5$ or represses dissolution thereof. This observation as well as the almost complete insolubility of the $Ca(OH)_2$ and the very poor physical dispersion of lime in the caustic liquor probably explains the high excess of lime required for phosphate control when fed directly to the digester.

A conversely stated advantage of the present invention is that the same amount of lime in pretreatment maintains a $P_2O_5$ concentration in the liquor approximately twice as low as the concentration resulting when lime is fed to the digester.

It is considered quite well established that the principal constituents of Bayer process liquor are sodium compounds, that is, hydroxide, aluminate, carbonate and phosphate. It appears that calcium hydroxide or lime charged directly to the digester reacts preferentially with the carbonate, the aluminate and the phosphate in the order named. On the basis of such mechanism, the above-cited formation of calcium aluminate accounts for the loss of alumina and the lower efficiency of $P_2O_5$ removal. It may be that the pretreatment slurry of calcium hydroxide and bauxite, in the absence of caustic, alkali carbonate, and aluminate, provides a medium enhancing the reactivity of the lime with the $P_2O_5$. This slurry is a saturated water solution of calcium hydroxide in which the undissolved lime is dispersed molecularly, thereby giving a more complete and homogeneous mixture with the bauxite. The alumina loss is lowered in subsequent digestion by the lime pretreatment apparently for the reason that the available lime becomes preferentially reactive with the $P_2O_5$ rather than the aluminate or carbonate. This, in turn, may be due to the fact that the lime in pretreatment contacts the bauxite when the alumina is present as such, whereas in the digester the alumina is ultimately in the form of sodium aluminate. In any event, the pretreatment appears to disperse the calcium and to fix it on the bauxite where it reacts or may subsequently react with the phosphate but to a lesser degree with the aluminate.

It is not intended to limit the invention to the foregoing possible mechanism or any other theory of action, but it suffices to state it has been discovered that predigestion treatment of bauxite with a water slurry of calcium hydroxide provides a superior means of controlling $P_2O_5$ concentrations in the process liquor and of effectively maintaining $P_2O_5$ contamination of alumina at a desired predetermined low value.

The following examples constitute specific illustrations of the process of the present invention and are not to be construed as a limitation thereof. Comparative results using lime directly to the digesters are also given.

EXAMPLE I

Constants 10 gms. of Jamaica bauxite containing 0.6% $P_2O_5$ (ten times that of typical Surinam bauxite).

40 ml. sodium aluminate liquor + 20 ml. $H_2O$.

Digested at 160° C. for 15 minutes and liquor tested for $P_2O_5$.

Variants

|   |   | $P_2O_5$ in Liquor on Bauxite |
|---|---|---|
|   |   | Per cent |
| 1 | Bauxite+liquor (no lime) | 0.49 |
| 2 | Bauxite+liquor+0.1 gm. $Ca(OH)_2$ | 0.27 |
| 3 | Bauxite+liquor+0.2 gm. $Ca(OH)_2$ | 0.15 |
| 4 | Bauxite+0.2 gm. $Ca(OH)_2$ in $H_2O$ (Pretreatment)+Liquor | 0.08 |
| 5 | Bauxite+0.1 gm. $Ca(OH)_2$ in $H_2O$ (Pretreatment)+Liquor | 0.14 |

The available $P_2O_5$ in the bauxite was 0.49%. All of this appeared in the liquor with no lime present.

Where lime was added to the slurry of mixed bauxite and caustic aluminate liquor followed by digestion, using a $CaO/P_2O_5$ ratio of about 3.5 to 1 and 4.5 to 1, the amount of $P_2O_5$ removed by precipitation and/or suppression was only about ¼ to ⅕ the weight of lime, respectively.

Lime treatment as shown in 4 and 5 with $CaO/P_2O_5$ ratios of about 3.7 to 1 and 2.2 to 1, respectively, precipitated and/or suppressed $P_2O_5$ in amount of about ½ to ⅖ the weight of lime.

Also, it is to be noted that, only one half the amount of lime added to the bauxite-aluminate liquor (lime direct to digester) was required when the bauxite was lime-pretreated in order to reduce the $P_2O_5$ in the liquor to the same value. (Compare 3 and 5.)

In the foregoing tests, the very low $P_2O_5$ concentration values, even though using a high phosphorus bauxite, were due to the fact that the aluminate liquor did not contain the "build up" concentration or equilibrium value of $P_2O_5$ which would occur in normal recycling.

The following example shows the effect of pretreatment in comparison to direct liming of the digester charge with a bauxite-liquor ratio equal to the charging ratio in plant practice and with the liquor fortified with $P_2O_5$ to a value somewhat above the equilibrium concentration.

EXAMPLE II

Constants 14 gms. of Jamaica bauxite of 0.6% $P_2O_5$.

100 ml. of spent liquor with 0.8 gram $P_2O_5$/liter.

Digested at 160° C. for 15 minutes and liquor analyzed.

Variants

|   |   | $P_2O_5$ in Liquor in g./l. |
|---|---|---|
| 1 | Bauxite+liquor, no lime | 1.47 |
| 2 | Bauxite+liquor+.37 g. $Ca(OH)_2$ | 0.69 |
| 3 | Bauxite+.37 g. $Ca(OH)_2$ in 10 ml. $H_2O$ (Pretreatment)+Liquor | 0.15 |
| 4 | Bauxite+.37 g. $Ca(OH)$ in 10 ml. $H_2O$ (Pretreatment)+calcined at 250–300° C. Liquor | 0.26 |
| 5 | Bauxite+Liquor+.18 g. $Ca(OH)_2$ | 1.03 |
| 6 | Bauxite+.18 g. $Ca(OH)_2$ in 5 ml. $H_2O$ (Pretreatment)+Liquor | 0.68 |
| 7 | Bauxite+.28 gm. CaO in 5 ml. $H_2O$ (Pretreatment) | 0.41 |

The $Ca/P_2O_5$ ratio of run 2 was 3.6, while that of runs 3 and 4 was 2.1 and 2.3 to 1, respectively. The pretreatment of run 3 was over four times as efficient as direct liming of run 2. Even the pretreatment plus calcination, which slightly increases $P_2O_5$ solubility, was over twice as efficient.

Where $CaO/P_2O_5$ ratios of 3.1 and 1.7, respectively were used in runs 5 and 6, the direct liming failed to reduced the $P_2O_5$ concentration to below 1 gram/liter. Resulting alumina contamination would be excessive, that is, over 0.002%. However, with the pretreatment of run 6, the $P_2O_5$ concentration was well below 1 gram/liter and efficiency was over 50% greater, that is, one and one-half times greater.

A comparison of the results of runs 3 and 7 indicate the advantage of using previously formed $Ca(OH)_2$ rather than CaO. The amounts used were stoichiometrically equivalent.

EXAMPLE III

In the following runs the spent aluminate liquor was given a $P_2O_5$ concentration of 0.3 gram per liter to test efficiency of lime treatment in maintaining this concentration as a maximum permissible while employing a high $P_2O_5$ bauxite.

Constants 14 gms. of Jamaica bauxite of 0.6% $P_2O_5$.

100 ml. of spent liquor containing 0.3 gram $P_2O_5$/liter.

Digestion at 160° C. for 15 minutes and liquor analyzed.

Variants

|   |   | $P_2O_5$ g./l. |
|---|---|---|
| 1 | Bauxite+liquor+0.16 g. CaO | 0.43 |
| 2 | Bauxite+0.22 g. $Ca(OH)_2$ in 7 ml. $H_2O$ (Pretreatment)+Liquor | 0.13 |

It may be seen that the $P_2O_5$ concentration in the liquor with pretreatment is well below 0.3 gram/liter, while direct liming failed to maintain the desired low level. The .16 g. of CaO and .22 g. of $Ca(OH)_2$ are equivalent amounts. In these runs the $CaO/P_2O_5$ ratio was about 2.8, and 1.9, respectively.

It is important to note that, in general, $CaO/P_2O_5$ ratios only slightly in excess of 1.5 are required in maintaining a $P_2O_5$ concentration of less than one gram per liter of liquor. This holds for aluminous ores having up to about 15 to 20 times as much $P_2O_5$ as Surinam bauxite, that is up to about 1.0% $P_2O_5$. Where it is desired to maintain the $P_2O_5$ concentration at a value of 0.5 or less in accordance with ordinary plant practice on low phosphorus ores, a $CaO/P_2O_5$ ratio of at least about 1.8 is required, and use of about 2 provides a safe margin for even the highest $P_2O_5$ bauxites. Excessive amounts of lime in pretreatment should be avoided as unnecessary and as likely to cause undue loss of alumina, unless the $P_2O_5$ content of the ore is extremely high.

Thus, it may be seen that the lime pretreatment of bauxite is at least twice as efficient as lime direct to the digester. Over twice as much lime must be added to the digester as the lime required in pretreatment to maintain the same $P_2O_5$ concentration in the liquor. In other words, lime in pretreatment will precipitate or repress about one-half its weight of $P_2O_5$ whereas lime direct to the digester will precipitate or repress only about one-fourth its weight.

I claim:

1. In a process for producing alumina from phosphorus-bearing aluminiferous ore material in which the material is digested with caustic soda liquor, the improvement which comprises treating the ore material with calcium hydroxide in an aqueous slurry prior to introduction thereof into said caustic soda liquor, and thereafter digesting the treated material with the caustic soda liquor, the amount of calcium hydroxide added to the ore material being such that the $P_2O_5$ concentration in the digesting liquor is maintained below about 1 gram per liter.

2. A process for controlling the concentration of $P_2O_5$ in the digesting caustic sodium aluminate liquor of a wet aluminate system for recovery of alumina from phosphorus-bearing aluminiferous ore material, which comprises treating the ore material in aqueous slurry with calcium hydroxide prior to introduction thereof into the digesting caustic liquor, the amount of calcium hydroxide used being such that the ratio of CaO to $P_2O_5$ precipitated or suppressed is not less than about 1.5.

3. A process according to claim 2 in which the ore material is subjected to a low temperature calcination after treatment with the calcium hydroxide and prior to digestion.

4. A process according to claim 2 in which the amount of calcium hydroxide employed in the predigestion treatment is such that the $CaO/P_2O_5$ ratio is at least about 1.8 whereby the $P_2O_5$ concentration in the digesting liquor is maintained at a level not greater than 0.5 gram per liter.

5. A process for the production of alumina from phosphorus-containing aluminiferous ore materials which comprises treating the ore material with lime in an aqueous slurry so that calcium hydroxide is present in an amount such that the ratio of CaO to $P_2O_5$ precipitated is not less than about 1.5, thereafter digesting the thus treated ore material in a caustic soda liquor in which the $P_2O_5$ concentration is maintained at a level below 1 gram per liter to form sodium aluminate, removing the insolubles from the liquor, and thereafter recovering alumina containing not more than 0.002% $P_2O_5$ by precipitation from said liquor.

6. A process of separating alumina from phosphorus-contaminated bauxite material which comprises suppressing subsequent dissolution of $P_2O_5$ by treating the material with lime in an aqueous slurry so that calcium hydroxide is present in an amount such that the ratio of CaO to total available $P_2O_5$ insolubilized is not less than about 1.5, thereafter digesting the lime-treated bauxite material in caustic soda liquor to form soluble sodium aluminate and insoluble compounds containing substantially all of the $P_2O_5$ whereby the $P_2O_5$ concentration in the liquor is maintained below 1 gram per liter, and removing the insoluble compounds containing the $P_2O_5$ together with other insolubles.

7. In a cyclic process for recovery of alumina from phosphorus-bearing aluminiferous ore material which comprises digesting successive quantities of the material with a recycled phosphate-contaminated liquor containing sodium hydroxide, sodium carbonate and sodium aluminate, reducing the alumina content of the liquor intermediate successive digestions, and adjusting the proportions of said hydroxide and carbonate to a predetermined value for each digestion by independent causticizing, the step of treating the successive quantities of the ore material with lime in a slurry so that calcium hydroxide is present prior to introduction of the ore material into the digesting liquor, said lime being present in an amount such that the ratio of CaO to total available $P_2O_5$ insolubilized is about 2 whereby the dissolution of $P_2O_5$ is partially suppressed and the balance thereof is substantially all precipitated during digestion, and thus maintaining a $P_2O_5$ concentration below about 0.5 gram per liter in the recycled liquor.

8. A process according to claim 7 in which the $CaO/P_2O_5$ ratio is not in excess of 3 to 1.

9. A process according to claim 7 in which the ore material is subjected to calcination at a temperature of from about 250 to about 500° C. after treatment with the calcium hydroxide and prior to digestion.

10. A process for suppressing the dissolution of $P_2O_5$ in the digesting caustic soda liquor of a wet aluminate system for recovery of alumina from phosphorus-bearing aluminiferous ore material which comprises treating the ore material with lime in aqueous slurry so that calcium hydroxide is present prior to introduction thereof into the digesting caustic liquor, the amount of calcium hydroxide being such that the $P_2O_5$ concentration in the digesting liquor is maintained below 1 gram per liter.

11. A process according to claim 10 in which the lime used for predigestion treatment is in the form of calcium hydroxide before incorporation into the aqueous slurry and before contact with the ore material.

12. A process for production of high grade alumina containing not more than 0.002% $P_2O_5$ from aluminiferous ore material containing $P_2O_5$ in substantial excess of the amounts normally present in high grade bauxite, which comprises suppressing subsequent dissolution of $P_2O_5$ by treating the ore material with lime in a slurry so that calcium hydroxide is present, the amount of lime added being such that ratio of CaO to total available $P_2O_5$ insolubilized is in excess of 1.5 and not more than 3, and thereafter digesting the lime treated ore material in a caustic sodium aluminate liquor.

13. A process according to claim 12 in which the $CaO/P_2O_5$ ratio is about 2 and the $P_2O_5$ concentration in the liquor is maintained at a level not exceeding 0.5 gram per liter.

14. A process according to claim 12 in which the aluminiferous ore material is a bauxite containing from about 3 to about 15 times more $P_2O_5$ than high grade bauxite.

15. A process according to claim 12 in which the lime treated ore material is subjected to calcination at a temperature not substantially greater than 500° C. prior to digestion in the caustic liquor.

16. A preliminary treatment for alumina-containing ore materials having a high phosphorus content prior to extraction of alumina by digestion in caustic sodium aluminate liquor, which comprises admixing the ore material with lime in an aqueous slurry prior to introduction thereof into the digesting caustic sodium aluminate liquor to thereby suppress dissolution of $P_2O_5$ upon subsequent digestion, the amount of lime being such that the ratio of CaO to total available $P_2O_5$ insolubilized is in excess of 1.5.

JOHN L. PORTER.

REFERENCES CITED

The following references are of record in the file of this patent:

UNITED STATES PATENTS

| Number | Name | Date |
|---|---|---|
| 535,076 | Pieper | Mar. 5, 1895 |